United States Patent
Lowe

(10) Patent No.: US 7,523,870 B2
(45) Date of Patent: Apr. 28, 2009

(54) RFID CARD RETENTION ASSEMBLY

(75) Inventor: Peter R. Lowe, Peyton, CO (US)

(73) Assignee: Assa Abloy AB, Stockholm (SE)

( * ) Notice: Subject to any disclaimer, the term of this patent is extended or adjusted under 35 U.S.C. 154(b) by 177 days.

(21) Appl. No.: 11/543,460

(22) Filed: Oct. 4, 2006

(65) Prior Publication Data
US 2008/0083829 A1 Apr. 10, 2008

(51) Int. Cl.
G06K 7/00 (2006.01)
(52) U.S. Cl. .................. 235/486; 235/380; 242/379
(58) Field of Classification Search ............ 235/486, 235/380; 242/379
See application file for complete search history.

(56) References Cited

U.S. PATENT DOCUMENTS

| 245,257 A * | 8/1881 | Wright ............ 242/379 |
| 6,121,544 A * | 9/2000 | Petsinger ............ 174/353 |
| 2003/0132132 A1* | 7/2003 | Small ............ 206/449 |
| 2007/0075910 A1* | 4/2007 | Kudou et al. ............ 343/841 |

FOREIGN PATENT DOCUMENTS

| DE | 202005013139 U1 | 2/2006 |
| WO | WO 01/00055 A1 | 1/2001 |
| WO | WO-01/00055 A1 * | 1/2001 |
| WO | WO 01/13350 A1 | 2/2001 |
| WO | WO 03/062099 A1 | 7/2003 |

OTHER PUBLICATIONS

Sogedex, Parc d'activités Pissaloup 4, rue Edouard Branly, Bat. Hermès 1, 78190 Trappes, France (http://www/sogedex.fr/sodegex/index.php?lang=uk&page=cata&section=zips (Nov. 22, 2005), pp. 1-2.
Baudville, Inc., 5380 52nd Street SE, Grand Rapids, MI 49512, USA (http://web.archive.org/web/20060901002822/http://shop.baudville.com (Sep. 1, 2006)).
European Search Report and Opinion for Application No. EP 07 11 7324, mailed Feb. 1, 2008.
Printout of Sogedex website (www.sogedex.fr) "badge reels" page, Nov. 22, 2005.

* cited by examiner

Primary Examiner—Michael G Lee
Assistant Examiner—Rafferty Kelly
(74) Attorney, Agent, or Firm—Sheridan Ross P.C.

(57) ABSTRACT

A card retention assembly includes a shield and a retraction mechanism. The shield is essentially non-transmissive of radio frequency signals and encloses a card receptacle which retains an RFID card when the retraction mechanism is in a retracted position. The retraction mechanism includes a spool and a retention line connectable to the RFID card and connected to the spool. Manually withdrawing the RFID card from the card receptacle causes the retention line to unwind from the spool and transitions the retraction mechanism from the retracted position to an extended position. The retraction mechanism is biased to the retracted position causing the retention line to wind back onto the spool and automatically returning the RFID card back to the card receptacle when the RFID card is manually released. Radio frequency communication between the RFID card and a proximal card reader is prevented when the RFID card is within the card receptacle and is permitted when the RFID card is outside the card receptacle.

27 Claims, 5 Drawing Sheets

RFID CARD RETENTION ASSEMBLY

TECHNICAL FIELD

The present invention relates generally to RFID cards and, more particularly, to a card retention assembly having a shield for protecting the privacy of information contained in an RFID card.

BACKGROUND OF THE INVENTION

Radio frequency identification (RFID) systems generally include at least one reader and a plurality of transponders which are typically termed RFID credentials. One common type of RFID credential comprises a passive radio frequency communication device embedded in a portable substrate, which is in the form of a plastic identification card and is termed an RFID card. The RFID card is carried by a person to be identified or otherwise characterized by a reader of an RFID system. The passive RFID card is dependent on the reader for its power. The reader "excites" or powers up the RFID card by transmitting excitation signals of a given frequency into the space surrounding the reader, which are received by the RFID card and provide the operating power for the circuitry of the recipient RFID card.

Communication between the reader and the RFID card is enabled by cooperative resonant circuits which are provided in each reader and RFID card. Each resonant circuit includes an inductor, typically in the form of an antenna, which magnetically couples to the inductor of the other resonant circuit through mutual inductance.

Communication is initiated when an RFID card is proximally positioned relative to the reader. The reader has a power supply which conveys a current to the reader resonant circuit causing the reader antenna to produce an excitation signal in the form of an electromagnetic field. The excitation signal couples to the antenna of the proximally-positioned RFID card through mutual inductance and the excitation signal powers and clocks the card circuitry initiating operation of the RFID card.

Card operation comprises generation of a response signal at a specified frequency and transmission of the response signal back to the reader. In particular, the card resonant circuit receives a current in response to the excitation signal which causes the card antenna to produce a response signal in the form of an electromagnetic field. The response signal couples to the reader antenna through mutual inductance in substantially the same manner as described above with respect to coupling of the excitation signal to the card antenna. The RFID card typically employs frequency or amplitude modulation of the response signal to encode data stored in the memory of the card circuitry into the response signal. When the response signal couples to the reader antenna, a corresponding current is induced in the reader antenna at the specified frequency. The reader processes the induced current to read the data encoded in the response signal from the RFID card.

RFID cards are commonly used for personal identification or security access applications during normal workday activities. For example, an individual may require his or her own personal RFID card to gain access into a secured area such as an office building, an elevator floor, an office suite, or a parking complex. To gain access to the secured area, the individual simply places the personal RFID card near a reader positioned at the entrance to the secured area so that the reader, which may be networked to a remote host computer, can identify the individual and authorize access to the secured area if appropriate.

It is apparent that in many cases it is necessary for an individual to make frequent use of a personal RFID card during the normal course of a work day. Accordingly, it is desirable for an individual to carry a personal RFID card on his or her person at all times during the work day. Although the RFID card is sized to easily fit within a purse, wallet, clothing pocket, briefcase, or other similar conventional mobile storage location, it is often inconvenient and cumbersome for the card holder to recall the specific mobile storage location where the RFID card is being stored at any given moment and to retrieve the RFID card from that location each time the card holder is required to present the RFID card. A more convenient and accessible means for a card holder to carry an RFID card on his or her person is desirable.

One specialized device a card holder can use to carry a personal RFID card on his or her person, which is both convenient and accessible, is termed a badge reel. Conventional badge reels are widely available, for example, at Sogedex, Parc d'activités de Pissaloup4, rue Edouard Branly, Bat. Hermès 1, 78190 Trappes, FRANCE (website: www.sogedex.fr) or Baudville, Inc., 5380 52nd Street SE, Grand Rapids, Mich. 49512, USA (website: shop.baudville.com).

A badge reel is essentially a tether for a badge (e.g., card) such as an RFID card. The badge reel consists of a line having one end attached to a spool, which has a mechanical biasing force applied to it to maintain the line wound on the spool. The free end of the line is attached to the RFID card. The badge reel is also provided with a clip for attachment to the outer clothing of a card holder. When the card holder desires to use the RFID card, the card holder simply grasps the RFID card, which is positioned proximal to the body, and pulls the RFID card away from the body to play out the line from the spool. When the line is unwound from the spool, the card holder is able to position the RFID card away from the body where the RFID card can easily be presented to a card reader without requiring the card holder to stand in a specific position. Once the card reader has read the RFID card, the card holder releases the RFID card from grasp. The mechanical biasing force of the spool reels the line back in and the RFID card returns to an unobtrusive position proximal to the body of the card holder.

Because RFID cards typically contain private and/or confidential information, there is a concern that the information can be inadvertently and undesirably accessed by any card reader which happens to be within the path of the card holder when the card holder is moving about during normal workday activities while carrying his or her personal RFID card. To overcome this concern, a means is needed for rendering the RFID card inoperable when the card holder has no intent or need to use the RFID card, yet which does not diminish the ready accessability of the RFID card when needed by the card holder.

Accordingly, it is generally an object of the present invention to provide an RFID card retention assembly which prevents information contained in an RFID card from being inadvertently read by a proximal card reader when the card holder does not intend to use the RFID card. It is generally another object of the present invention to provide such an RFID card retention assembly which maintains the RFID card readily accessible to the card holder at all times should the card holder desire to use the RFID card. It is still another object of the present invention to provide such an RFID card retention assembly which shields the RFID card from view when not in use. These objects and others are accomplished in accordance with the invention described hereafter.

SUMMARY OF THE INVENTION

The present invention is a card retention assembly comprising a shield and a retraction mechanism. The shield has a card receptacle and an opening into the card receptacle. Both are cooperatively sized to receive an RFID card into the card receptacle through the opening. The shield is sufficiently non-transmissive of radio frequency signals to enable the shield to essentially prevent radio frequency communication between an RFID card positioned in the card receptacle and a card reader positioned proximal to the shield.

The retraction mechanism includes a spool and a retention line connected to and windable around the spool. The retention line extends into the card receptacle and is connectable to an RFID card receivable in the card receptacle. The retraction mechanism has a retracted position and an extended position. The retention line unwinds from the spool when the retraction mechanism transitions from the retracted position to the extended position and the retention line winds onto the spool when the retraction mechanism transitions from the extended position to the retracted position. In accordance with one embodiment, the card retention assembly further comprises a biasing spring coupled to the spool. As such, the spool is biased in a rotational direction which biases the retraction mechanism in the retracted position.

The retraction mechanism preferably further includes a housing enclosing a housing chamber. The spool is disposed within the housing chamber and the housing is coupled to the shield. A housing aperture is preferably formed through the housing and a shield aperture is preferably formed through the shield to provide a retention line pathway between the housing chamber and the card receptacle.

The shield preferably includes opposing front and rear planar sections bounding the front and rear of the card receptacle, first and second side sections formed between the front and rear planar sections along side edges of the front and rear planar sections and bounding corresponding sides of the card receptacle, and a top section formed between the front and rear planar sections along top edges of the front and rear planar sections and bounding a corresponding top of the card receptacle. Each of the above-recited sections is preferably optically opaque.

The opening into the card receptacle is positioned between the front and rear planar sections along bottom edges of the front and rear planar sections. The shield may also include an indent sufficiently sized to expose an RFID card positioned in the card receptacle and enable a card holder to grasp the RFID card and manually withdraw the RFID card from the card receptacle.

In accordance with one embodiment, the shield consists essentially of a shell which is essentially non-transmissive of radio frequency signals. The shell is preferably constructed from a metallized plastic or a metal.

In accordance with another embodiment, the shield comprises a shell which is relatively non-transmissive of radio frequency signals and an insulative layer which is relatively transmissive of radio frequency signals. The insulative layer disposed on a surface of the shell and is preferably constructed from a polymeric foam.

In accordance with yet another embodiment, the shield comprises a shell which is relatively transmissive of radio frequency signals and an insert which is relatively non-transmissive of radio frequency signals. The insert is disposed within the shell which is preferably constructed from a plastic. The insert is preferably constructed from a metallized plastic or a metal.

In accordance with still another embodiment, the shield comprises a planar section, a view window, a card receptacle, and an opening into the card receptacle. The view window is positioned in the planar section and the card receptacle is bounded in part by the planar section. The card receptacle and opening are sized to receive an RFID card into the card receptacle through the opening. The planar section and view window are sufficiently non-transmissive of radio frequency signals to enable the shield to essentially prevent radio frequency communication between an RFID card positioned in the card receptacle and a card reader positioned proximal to the shield. The view window is sufficiently optically transparent of light to enable a viewer to view a portion of an RFID card positioned in the card receptacle through the view window.

The planar section is preferably constructed from a continuous solid sheet of a metallized plastic or a metal and is preferably essentially optically opaque. The view window is likewise preferably constructed from a metallized plastic or a metal, but is configured as a mesh sheet or a perforated sheet to enable optical transparency. The view window is alternately constructed from a sheet of transparent, relatively transmissive material in association with the mesh sheet or perforated sheet of the metallized plastic or metal to form a laminate.

In another characterization, the present invention is a method for transitioning an RFID card between a retracted position and an extended position. The method connects a first end of a retention line to a spool and an opposite second end of the retention line to an RFID card. The spool is rotated in a retraction rotation direction to wind the retention line around the spool, thereby positioning the RFID card in a retracted position within a card receptacle. The card receptacle is enclosed by a shield sufficiently non-transmissive of radio frequency signals to enable the shield to essentially prevent radio frequency communication between the RFID card positioned in the card receptacle and a card reader when the RFID card is positioned in a read range of the card reader.

The RFID card is positioned in an extended position by withdrawing the RFID card from the card receptacle, preferably manually, to enable radio frequency communication between the RFID card and the card reader when the RFID card is positioned in the read range of the card reader. The spool rotates in an extension rotation direction opposite the retraction rotation direction to unwind the retention line from around the spool when the RFID card is withdrawn from the card receptacle.

In accordance with one embodiment, the method further comprises biasing the spool in the retraction rotation direction to bias the RFID card to the retracted position.

In accordance with another embodiment, the method further comprises positioning the spool external to the card receptacle and providing a shield aperture through the shield to provide a retention line pathway between the spool and the card receptacle.

In accordance with still another embodiment, the method further comprises extending the retention line through the shield aperture and out the card receptacle when the RFID card is withdrawn from the card receptacle.

The present invention will be further understood from the drawings and the following detailed description. Although this description sets forth specific details, it is understood that certain embodiments of the invention may be practiced without these specific details. It is also understood that in some instances, well-known techniques or structures have not been shown in detail in order to avoid obscuring the understanding of the invention.

Figure 1:
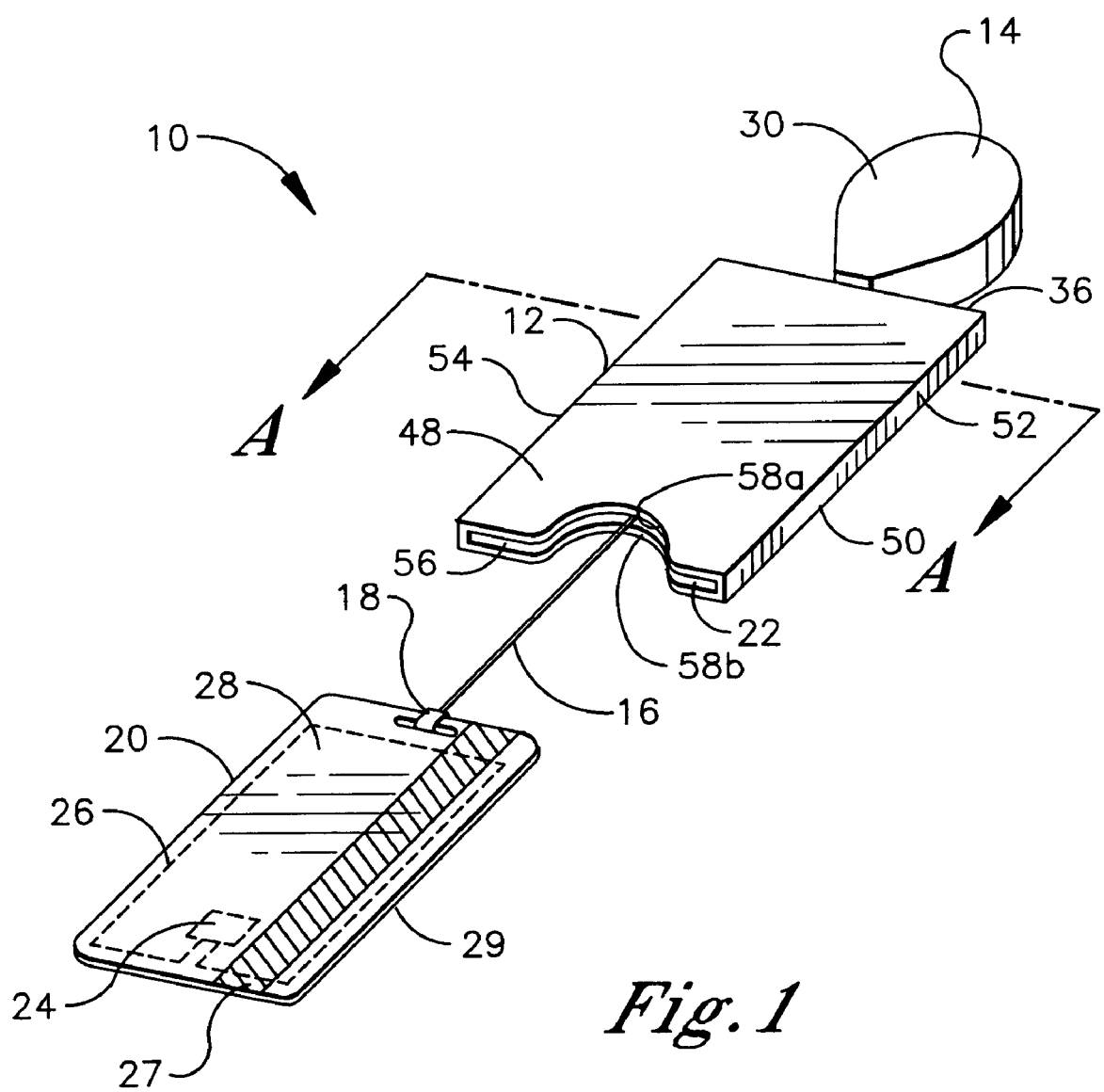
FIG. 1 is a perspective view of a card retention assembly of the present invention and an associated RFID card.

Embodiments of the invention are illustrated by way of example and not by way of limitation in the above-recited figures of the drawings in which like reference characters indicate the same or similar elements. It should be noted that common references to "an embodiment", "one embodiment", "an alternate embodiment", "a preferred embodiment", or the like herein are not necessarily references to the same embodiment.

DESCRIPTION OF PREFERRED EMBODIMENTS

Figure 2:
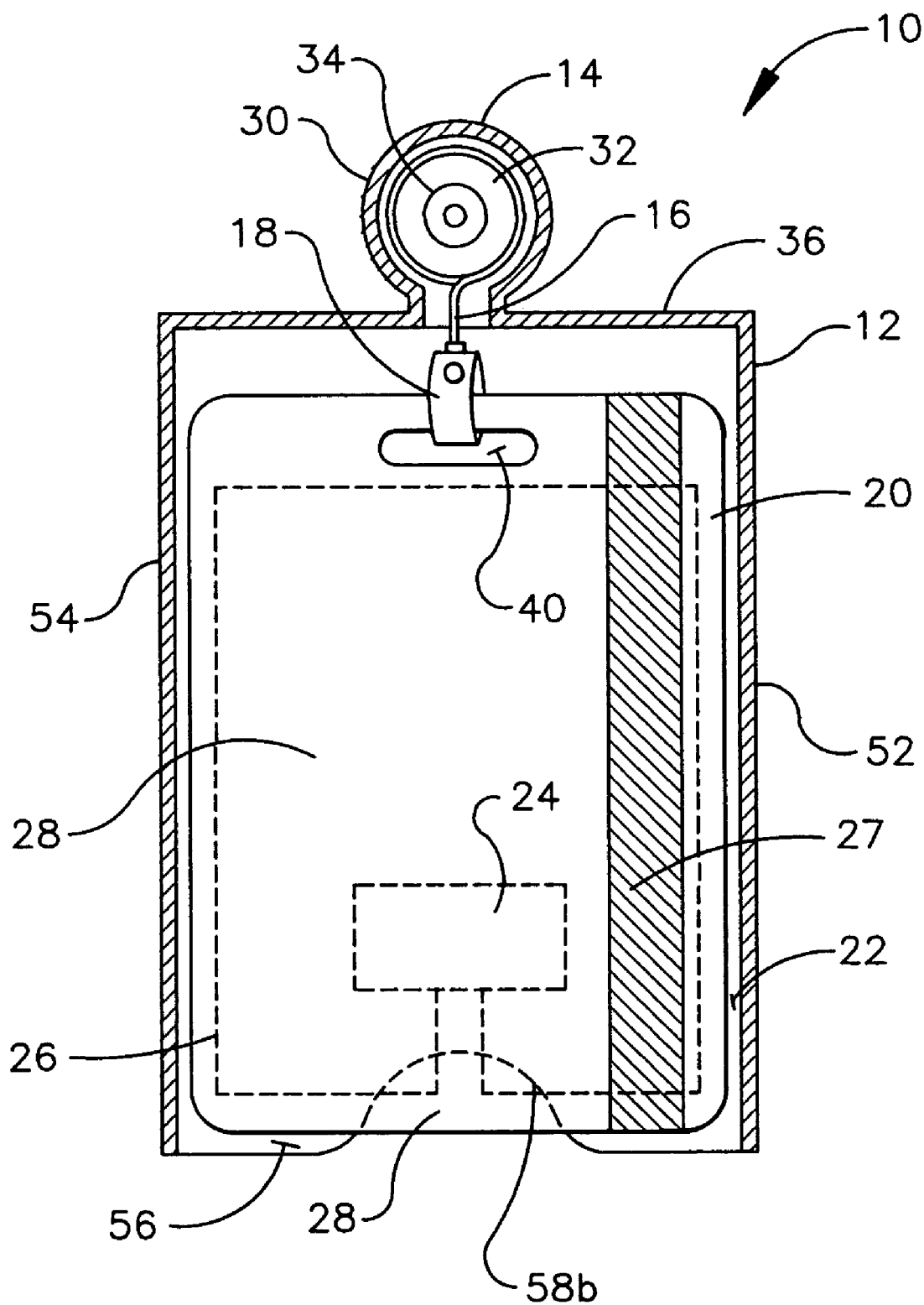
FIG. 2 is a cross-sectional rear plan view of the card retention assembly of FIG. 1.

A card retention assembly generally designated 10 is shown and described with initial reference to FIGS. 1 and 2. The card retention assembly 10 comprises a privacy shield 12 and a retraction mechanism 14 coupled to the privacy shield 12. The retraction mechanism 14 includes a retention line 16 and a connection strap 18 which is attached to an end of the retention line 16. The retraction mechanism 14 has a retracted position and a range of extended positions culminating in a fully extended position. The retraction mechanism 14 is shown in a partially extended position in FIG. 1 and in the retracted position in FIG. 2. The positions of the retraction mechanism 14 are described in greater detail below.

The card retention assembly 10 is configured for cooperative use with a radio frequency identification (RFID) card 20. An RFID card, as the term is used herein, refers to: 1) passive transponders configured as cards which communicate with a card reader in a contactless manner at a nominal carrier frequency of about 125 kHz frequency (commonly termed proximity cards), 2) passive transponders configured as cards which communicate with a card reader in a contactless manner at a nominal carrier frequency of about 13.56 MHz (commonly termed smart cards), or 3) passive transponders configured as cards which communicate with a card reader in a contactless manner at substantially any other radio frequency. The privacy shield 12 encloses a card receptacle 22 which is an open-ended chamber for receiving and retaining an RFID card 20 when the retraction mechanism 14 is in the retracted position. The connection strap 18 is configured for attachment to the RFID card 20, thereby effecting secure connection of the retention line 16 to the RFID card 20 at all times.

The RFID card 20 is a plastic card having physical characteristics similar to a conventional credit card or photo identification card. Passive transponder components are embedded in the RFID card 20 which include an integrated circuit 24 and an antenna 26. The integrated circuit 24 embodies the processing and memory capabilities of the RFID card 20. The antenna 26 is coupled to the integrated circuit 24 and is a "dual-function antenna" which performs both the receiving and transmitting functions of the RFID card 20. Alternatively, two separate receiving and transmitting antennas can be substituted for the single "dual function antenna" in the RFID card.

The RFID card 20 is typically carried by an authorized person termed the card holder. Information contained in the RFID card 20 enables a compatible card reader to identify or otherwise characterize the card holder when the RFID card 20 is presented to the card reader. In particular, information in digital form is stored in the integrated circuit 24 of the RFID card 20, which is electronically read in a conventional contactless manner as described above when a card holder positions the RFID card 20 near the compatible card reader. The RFID card 20 optionally includes one or more supplemental components not shown in FIG. 1, which enable alternate identification technologies in addition to the present noncontact RFID technology, such as magnetic stripe, Wiegand, contact smart chip, barcode, biometric, photo identification, or graphic (including holographic and text) technology.

The RFID card 20 is shown, by way of example, to include other functionalities in addition to the RFID functionality, i.e., components 24, 26. In particular, the RFID card 20 has a magnetic stripe 27 containing magnetically stored information which enables magnetic stripe technology. In many cases the RFID card 20 includes an optical medium (not shown) in addition to the magnetic strip 27, which enables one or more additional technologies. In such cases, the magnetic strip 27 and the optical medium are oftentimes positioned on opposite faces of the RFID card 20. For example, the magnetic strip 27 is positioned on a rear face 28 of the RFID card 20 and the optical medium is displayed on a front face 29 of the RFID card 20.

An optical medium is characterized herein as displaying information in visual form which requires visual access to read and is readable by an appropriate person and/or machine. Examples of optical media include text, photos, bar codes, holograms, biometric images, and the like. The phrase "information contained in the RFID card" as used herein, unless specifically stated otherwise, refers generally to information which is stored in a storage medium mounted within or on the RFID card as well as to information which is visually displayed on the face of the RFID card.

The retraction mechanism 14 is provided to automatically return the RFID card 20 to the card receptacle 22 when the RFID card 20 has been withdrawn from the card receptacle 22 for use as described below, but use of the RFID card 20 is no longer required. The retraction mechanism 14 is essentially a reel which, in addition to the retention line 16 and connection strap 18, further includes a housing 30, a spool 32 and a biasing spring 34. The housing 30 is securely attached to a top section 36 of the privacy shield 12 and substantially encloses a housing chamber 38. The spool 32 and cooperative biasing spring 34 are operatively disposed within the housing chamber 38.

Figure 3:
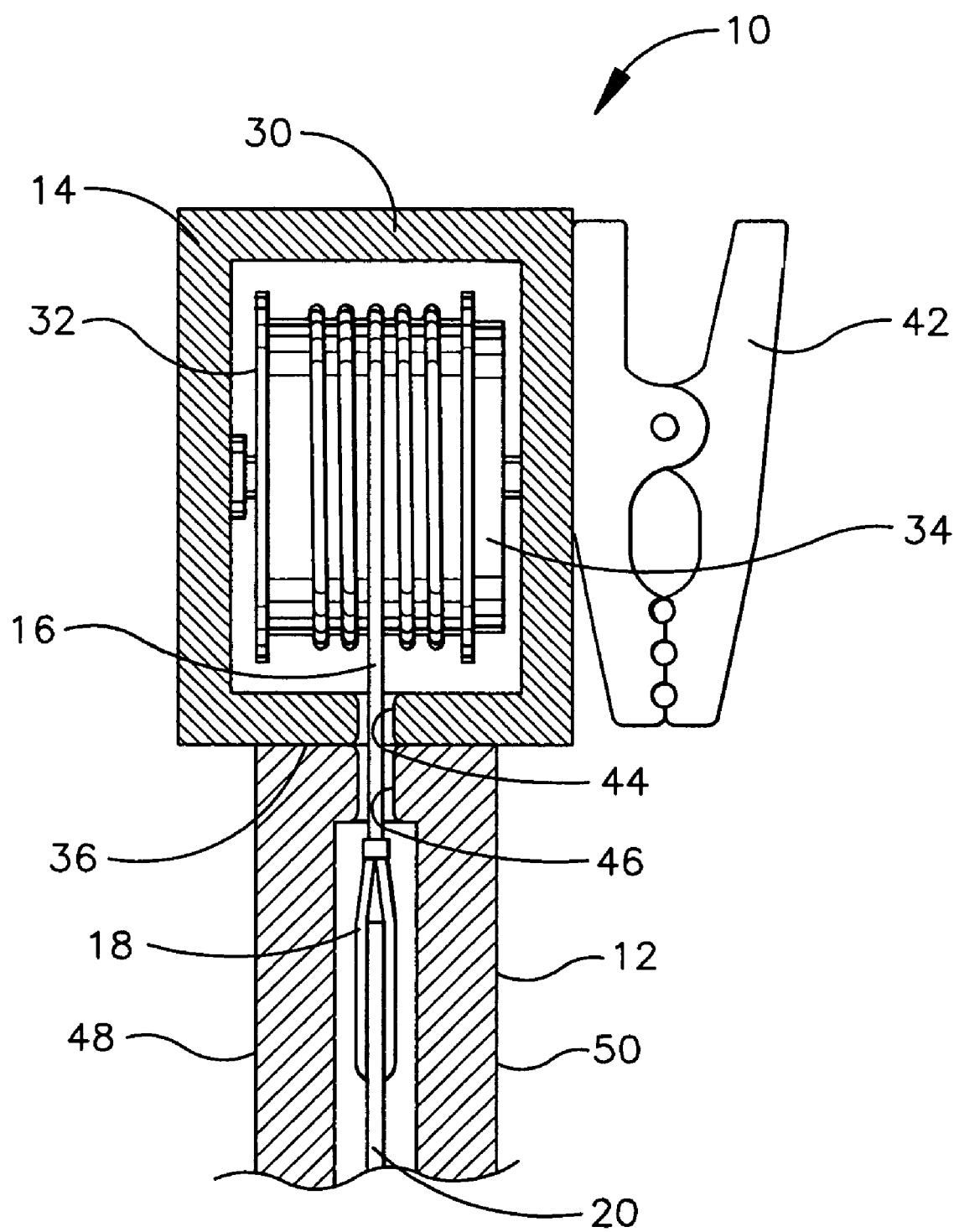
FIG. 3 is an enlarged partial cross-sectional side elevational view of the card retention assembly of FIG. 1.

Referring additionally to FIG. 3, the cylindrically configured spool 32 is rotationally mounted to the inside wall of the housing 30 which enables rotation of the spool 32 about its central axis within the housing chamber 38. A first end of the retention line 16 is securely attached to the spool 32 and the opposite second end of the retention line 16 is securely attached to the connection strap 18 by any suitable fastening means. The connection strap 18 is in turn securely attached to the RFID card 20 likewise by any suitable fastening means. For example, attachment of the connection strap 18 to the RFID card 20 is effected by threading the connection strap 18 through a connection hole 40 formed through the card 20, looping the strap 18 back onto itself, and riveting the strap 18 to itself. A preferred material of the connection strap 18 is a thin plastic ribbon. The retention line 16 is a thin, durable, highly-pliable line formed from substantially any suitable material such as a string, thread, ribbon, cord, cable, or the like, and is preferably formed from a high-strength string. An exemplary length of the retention line 16 is approximately 2 to 3 feet, while an exemplary length of the connection strap 18 is approximately 1 inch.

Although not a limitation of the present invention, materials of the retention line 16 and connection strap 18 are preferably essentially non-stretchable during routine operation of the card retention assembly 10. Furthermore, although the retraction mechanism 14 of the present embodiment is distinct from and essentially external to the privacy shield 12, it is within the scope of the present invention to alternately configure the privacy shield 12 and retraction mechanism 14 such that the retraction mechanism 14 is integral with the privacy shield 12 and/or is positioned within the interior of the privacy shield 12.

The retraction mechanism 14 has an attachment clip 42, such as a conventional alligator clip, mounted on a rear exterior surface of the housing 32 as shown or alternatively on a rear exterior surface of the privacy shield 12. The attachment clip 42 permits releasable attachment of the card retention assembly 10 to clothing or a belt so that the card holder can wear the card retention assembly 10 outside his or her clothing, but in a predictable unobtrusive location proximal to the body. As a result the card holder has ready access to the RFID card 20 when retained by the card retention assembly 10. It is noted that the attachment clip 42 is only one example of a suitable means permitting the card holder ready access to the RFID card 20. Alternate means within the scope of the present invention include a neck strap which is attachable to the retraction mechanism 14 or privacy shield 12 and is adaptable for wearing around the neck of the card holder.

The housing 30 has an aperture 44 aligned with an aperture 46 formed in the top section 36 of the privacy shield 12. The aligned apertures 44, 46 provide an unimpeded pathway for the retention line 16 between the housing chamber 38 and the card receptacle 22. When the retraction mechanism 14 is in the retracted position, essentially the entirety of the retention line 16 is wound around the circumferential edge of the spool 32 with only a relatively short segment of the retention line 16 extending through the apertures 44, 46 for attachment to the connection strap 18 as shown in FIG. 3. When the retraction mechanism 14 is in the retracted position, essentially the entirety of the connection strap 18 and RFID card 20 resides in the card receptacle 22 of the privacy shield 12 as shown in FIGS. 2 and 3.

The retraction mechanism 14 transitions from the retracted position to the extended position by drawing the RFID card 20 out of the card receptacle 22 and away from privacy shield 12, while retaining the retention line 16 in connection with the RFID card 20 via the connection strap 18 as shown in FIG. 1 and simultaneously retaining the retention line 16 in engagement with the spool 32 (thereby correspondingly drawing the retention line 16 through the apertures 44, 46). Displacement of the RFID card 20 from the card receptacle 22 rotates the spool 32 in a first rotational direction which unwinds an increasingly longer segment of the retention line 16 from the spool 32. The distance that the RFID card 20 separates from the privacy shield 12 corresponds essentially to the length of the unwound segment of the retention line 16 less the length of the privacy shield 12.

The retraction mechanism 14 preferably reaches the fully extended position when the retention line 16 is fully played out, i.e., essentially the entire length of the retention line 16 is unwound from the spool 32. The distance that the RFID card 20 is separated from the privacy shield 12 when the retraction mechanism 14 is in the fully extended position, corresponds essentially to the entire length of the retention line 16 less the length of the privacy shield 12 (which is essentially negligible relative to the entire length of the retention line 16). Thus, in an exemplary case where the length of the retention line 16 is two feet, the fully extended position of the retraction mechanism 14 provides the RFID card 20 with approximately 2 feet of clearance from the body of the card holder.

The biasing spring 34, which may be a conventional coil or leaf spring, is coupled to the spool 32 in a manner which biases rotation of the spool 32 in a second rotational direction opposite the first rotational direction that winds the retention line 16 onto the spool 32. Unwinding the retention line 16 from the spool 32 requires application of an opposing external force to the retraction mechanism 14 which is greater than the biasing force of the spring 34 to rotate the spool 32 in the first rotational direction. Accordingly, the biasing spring 34 returns the retraction mechanism 14 to the retracted position whenever the retraction mechanism 14 is in the fully extended position or a partially extended position in the absence of a sufficient opposing external force being applied to the retraction mechanism 14.

The privacy shield 12 functions as a shroud for the RFID card 20 when the card 20 is not in use for its intended application. Intended RFID card applications include identification, security access, logical access, and cash transactions to name a few. The dimensions and configuration of the privacy shield 12 and correspondingly the card receptacle 22 are a function of the dimensions and configuration of the RFID card 20. In a preferred embodiment, the privacy shield 12 and correspondingly the card receptacle 22 each have a rectangular configuration such that the card receptacle 22 accommodates a single conventionally sized RFID card.

The privacy shield 12 is defined by a rear planar section 48, a front planar section 50, first and second side sections 52, 54 and the top section 36. The rear and front planar sections 48, 50 of the privacy shield 12 are essentially identically constructed and are disposed in spaced-apart relationship to one another forming the card receptacle 22 therebetween. The first and second side sections 52, 54 of the privacy shield 12 are essentially identically constructed and engage the side edges of the rear and front planar sections 48, 50 and enclose the sides of the card receptacle 22. The top section 36 similarly engages the top edges of the rear and front planar sections 48, 50 and encloses the top of the card receptacle 22. The bottom of the card receptacle 22 is a slotted opening 56 which maintains the card receptacle 22 open to the outside and freely permits removal or insertion of the RFID card 22 from or into the card receptacle 22.

The bottom opening 56 is preferably sized to receive a narrow leading edge of the RFID card 22. The rear and front planar sections 48, 50 of the privacy shield 12 preferably have correspondingly aligned indents 58a, 58b formed along their exposed bottom edges to expose a small portion of the tail end of the RFID card 20 when the retraction mechanism 14 is in the retracted position and the RFID card 20 is retained in the card receptacle 22. The indents 58a, 58b enable the card holder to grasp the RFID card 20 with the fingers when the card holder desires to withdraw the RFID card 20 from the card receptacle 22 to transition the retraction mechanism 14 from the retracted position to the extended position.

The privacy shield 12 is preferably constructed as a single integral structure or is alternatively constructed in separate sections, which are joined or otherwise assembled together. Various specific embodiments of privacy shield constructions are shown and described below with reference to FIGS. 4 through 8, which all have alternate utility in the card retention assembly 10 shown in FIGS. 1-3.

Figure 4:
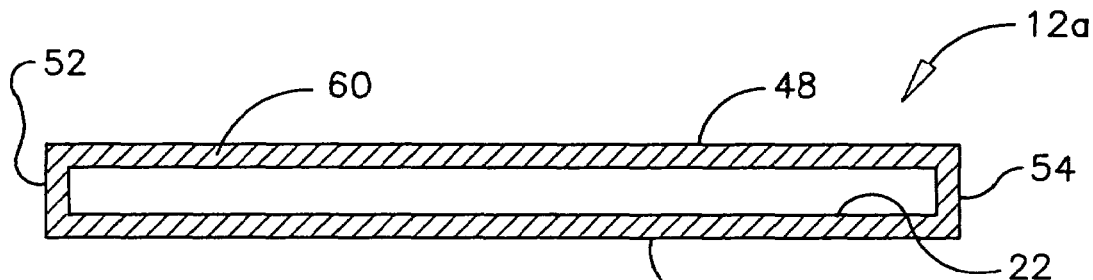
FIG. 4 is a cross-sectional view of an embodiment of a privacy shield included in the card retention assembly of FIG. 1 taken along line A-A.

Referring initially to FIG. 4, an embodiment of a privacy shield generally designated 12a is shown and described. The privacy shield 12a is a durable hard shell 60 preferably constructed essentially in its entirety from a single material. The shell 60 is characterized as being essentially non-transmissive of RF energy. A structure generally characterized as being essentially non-transmissive of RF energy herein can be more particularly characterized as being either sufficiently reflective or absorptive of RF energy or both to substantially prevent all or a substantial portion of the RF energy contacting the structure to pass through the structure. Exemplary materials which can be used to construct the non-transmissive shell 60 include those which are deemed metallic in character such as metal or metallized plastic. Metallized plastic structures are typically constructed by molding the molten metallized plastic into the desired configuration of the shell 60. Metal structures are typically constructed by forming one or more sheets of the metal into the desired configuration. In any case, the non-transmissive shell 60 renders an RFID card essentially inoperable when positioned between the RFID card and a compatible card reader.

Figure 5:
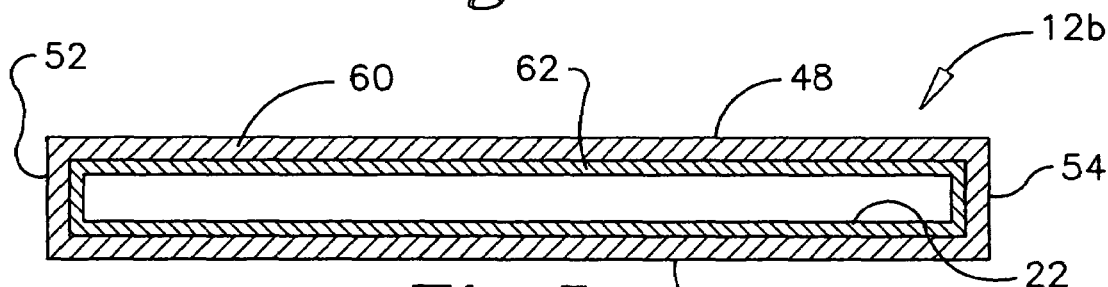
FIG. 5 is a cross-sectional view of an embodiment of a privacy shield included in the card retention assembly of FIG. 1 taken along line A-A, wherein the privacy shield has an insulating layer disposed on an inner surface of the privacy shield.

Referring to FIG. 5, an alternate embodiment of a privacy shield generally designated 12b is shown and described. The privacy shield 12b includes a shell 60 having essentially the same construction and properties as the shell 60 of the privacy shield 12a, but further includes an inner insulative layer 62 disposed as a liner on an inner surface of the shell 60. As such, the inner insulative layer 62 partially or entirely lines the walls of the card receptacle 22. The inner insulative layer 62 is relatively more pliant and more RF transmissive than the shell 60. As such, the inner insulative layer 62 insulates the RFID card 20 from contact with the shell 60 and correspondingly protects the RFID card 20 from possible damage due to abrasion from the shell 60. A preferred material of the insulative layer 62 is a polymeric foam.

Figure 6:
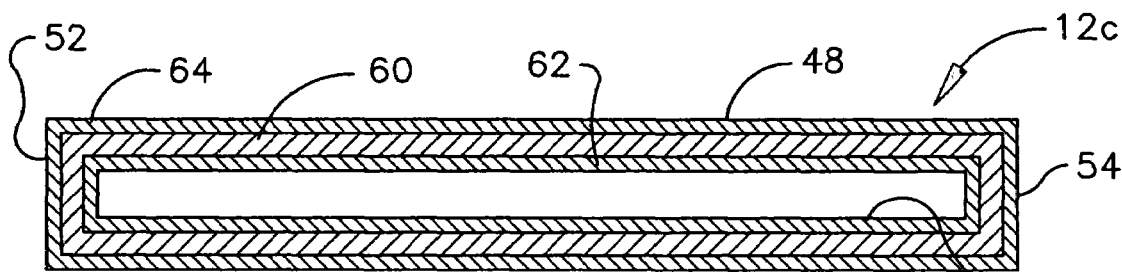
FIG. 6 is a cross-sectional view of an embodiment of a privacy shield included in the card retention assembly of FIG. 1 taken along line A-A, wherein the privacy shield has an insulating layer disposed on an inner surface and an outer surface of the privacy shield.

Referring to FIG. 6, an alternate embodiment of a privacy shield generally designated 12c is shown and described. The privacy shield 12c includes a shell 60 and an inner insulative layer 62 having essentially the same construction and properties as the shell 60 and inner insulative layer 62 of the privacy shield 12b, and further includes an outer insulative layer 64 disposed as a coating on an outer surface of the shell 60. The outer insulative layer 64 is preferably formed from the same or a substantially similar material as the inner insulative layer 62.

Figure 7:
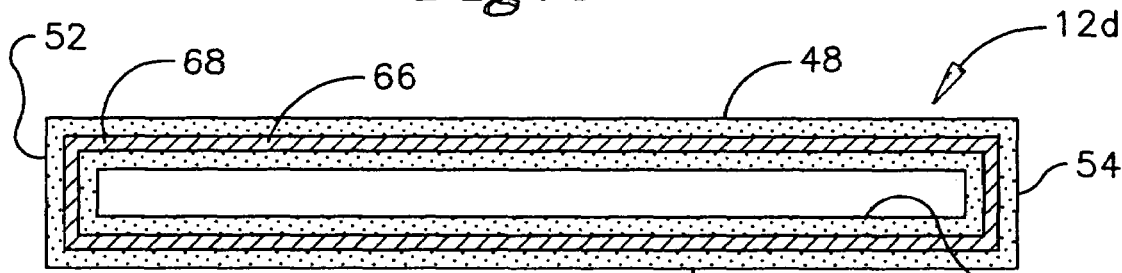
FIG. 7 is a cross-sectional view of an embodiment of a privacy shield included in the card retention assembly of FIG. 1 taken along line A-A, wherein the privacy shield has an RF non-transmissive insert disposed within an RF transmissive shell.

Referring to FIG. 7, an alternate embodiment of a privacy shield generally designated 12d is shown and described. The privacy shield 12d includes a relatively RF transmissive shell 66 and a relatively RF non-transmissive insert 68. The shell 66 is formed from a material which is relatively less hard than the material of the insert 68. An exemplary material of the shell 66 is an RF transmissive plastic or a resin and an exemplary material of the insert 68 is an RF non-transmissive metal or a metallized plastic. The privacy shield 12d is preferably constructed by injection molding the shell 66 around essentially the entirety of the insert 68, which is preferably a four- or five-sided essentially continuous unitary structure. The non-transmissive insert 68 renders an RFID card essentially inoperable when positioned between the RFID card and a compatible card reader.

Figure 8:
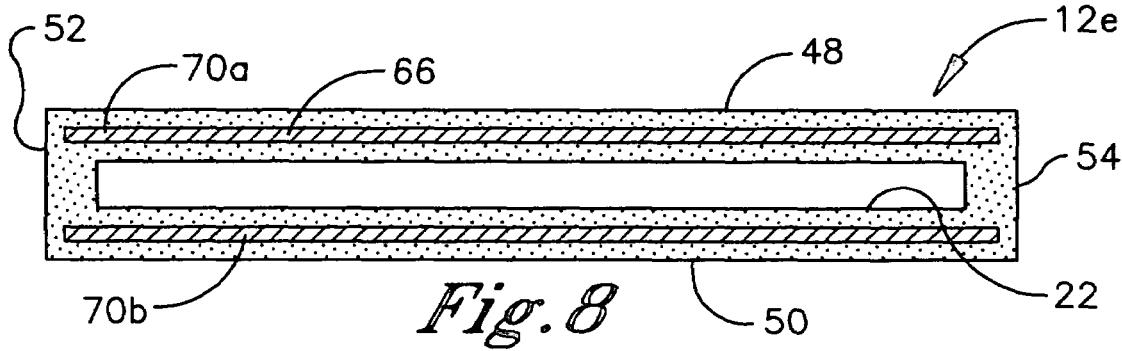
FIG. 8 is a cross-sectional view of an embodiment of a privacy shield included in the card retention assembly of FIG. 1 taken along line A-A, wherein the privacy shield has a plurality of RF non-transmissive inserts disposed within an RF transmissive shell.

Referring to FIG. 8, an alternate embodiment of a privacy shield generally designated 12e is shown and described. The privacy shield 12e includes a relatively RF transmissive shell 66 and a plurality of relatively RF non-transmissive inserts 70a, 70b. The shell 66 has essentially the same construction and properties as the shell 66 of the privacy shield 12d. The inserts 70a, 70b likewise have essentially the same properties as the shell 66 of the privacy shield 12d. However, rather than having a single continuous insert construction, the privacy shield 12e disposes the insert 70a in the front of the shell 66 and the separate and distinct insert 70b in the back of the shell 66 with the inserts 70a, 70b being discontinuous on the sides of the shell 66. The non-transmissive inserts 70a, 70b render an RFID card essentially inoperable when either is positioned between the RFID card and a compatible card reader.

In sum, it is apparent that all of the above-recited embodiments of the privacy shield 12a, 12b, 12c, 12d, 12e render the RFID card 20 inoperable for its RFID functionality when the RFID card 20 is enclosed within the card receptacle 22 by the privacy shield 12, i.e., when the retraction mechanism 14 is in the retracted position. Specifically, the RF non-transmissive character of the privacy shield 12 essentially blocks the transmission of electromagnetic energy, namely, RF signals, in either direction past the privacy shield 12. When it is desired to return the RFID card 20 to RFID operability, the card holder simply withdraws the RFID card 20 from the card receptacle 22 and transitions the retraction mechanism 14 to an extended position.

Figure 9:
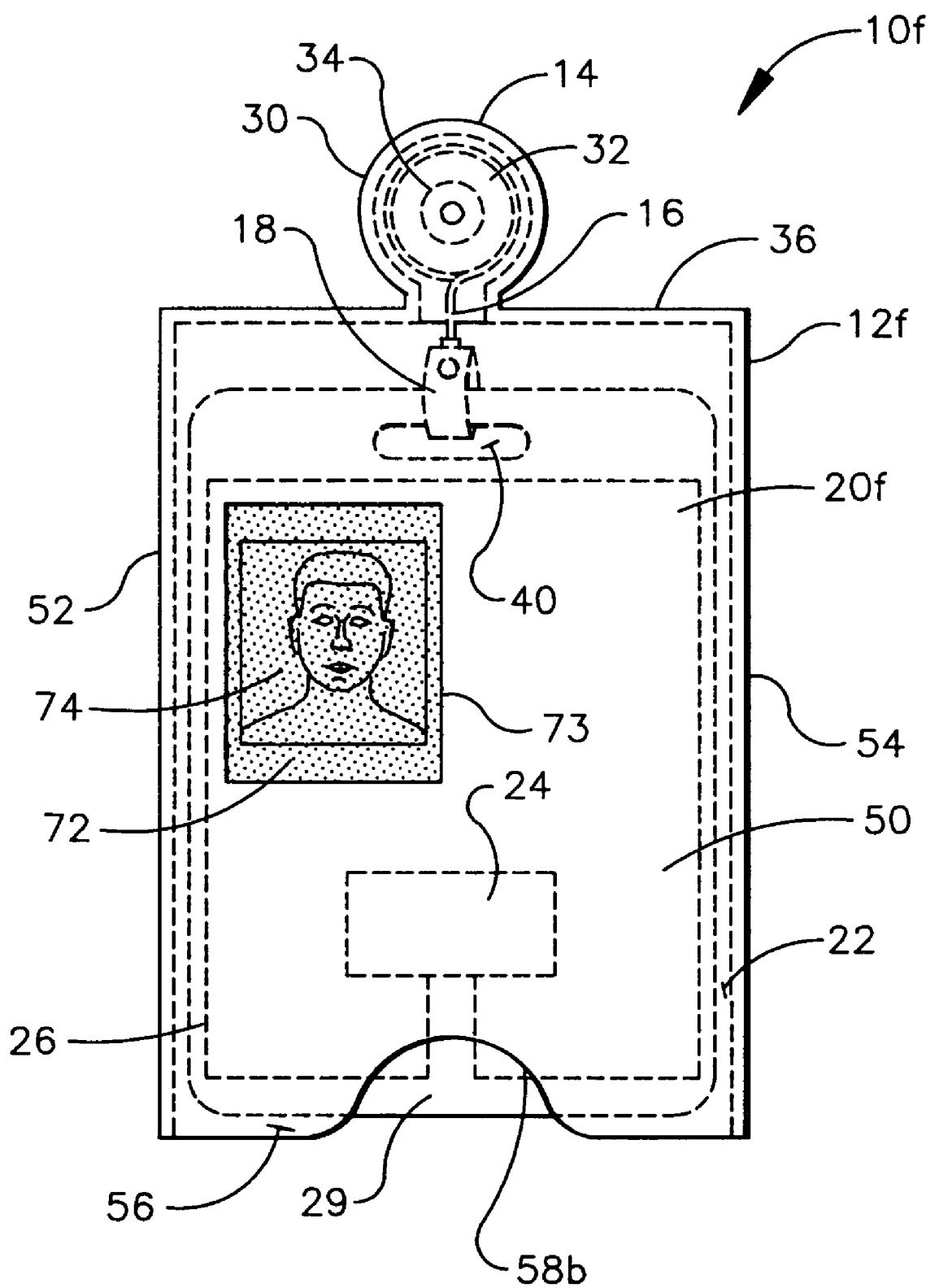
FIG. 9 is a front plan view of an alternate embodiment of the card retention assembly of the present invention and an associated RFID card.

Referring to FIG. 9, a specific embodiment of a card retention assembly generally designated 10f is shown and described along with an associated RFID card 20f. The card retention assembly 10f is essentially the same as the card retention assembly 10 of FIGS. 1-3 except that the privacy shield 12f of the card retention assembly 10f is shown to include a view window 72 positioned in the front planar section 50 of the privacy shield 12f. The view window 72 is preferably a discrete planar member closely fitted into a window opening formed in the front planar section 50 and integrally joined with the edges 73 of the window opening which are sized identically to the outer perimeter of the view window 72. The view window 72, like the remainder of the privacy shield 12f, is characterized as RF non-transmissive, but is also further characterized as having specific optical properties. In particular, the view window 72 is characterized as being sufficiently optically transparent to light to enable the viewer to view the portion of the RFID card 20f positioned behind the view window 72 when the retraction mechanism 14 is in the retracted position with the RFID card 20f retained within the card receptacle 22 of the privacy shield 12f.

The view window 72 is preferably located in the front planar section 50 of the privacy shield 12f so that the view window 72 faces outward when the card retention assembly 10f is being worn by a card holder. The view window 72 is specifically positioned relative to the front planar section 50 so that the view window 72 aligns with an optical medium 74 visually displayed on the front face 29 of the RFID card 20f, such as an ID photo of a card holder, when the RFID card 20f is retained within the card receptacle 22. Thus, the view window 72 enables a viewer to view the optical medium 74 though the view window 72 of the privacy shield 12f without requiring the card holder or viewer to withdraw the RFID card 20f from the card receptacle 22 even if the remainder of the privacy shield 12f other than the view window 72 is opaque.

The view window 72 can be constructed from substantially any material which provides the view window 72 with the desired characteristics of RF non-transmissiveness and optical transparency. In accordance with one embodiment, the view window 72 is constructed at least in part from the same RF non-transmissive material as the remainder of the privacy shield 12 such as a metal or metallized plastic. Most metal or metallized plastic is essentially optically opaque when configured as a continuous sheet, which is a preferred configuration of the privacy shield 12 of FIGS. 1-3. However, the metal or metallized plastic can be reconfigured to a diaphanous form such as a mesh or perforated sheet for construction of the view window 72. Thus, the view window 72 is preferably a mesh or perforated sheet which has sufficiently small openings formed therein to substantially prevent all or a substantial portion of the RF energy contacting the view window 72 from passing through the view window 72, but which has a sufficient number of such openings formed therein to substantially enable a viewer looking at the view window 72 to see through the view window 72.

The view window 72 can alternatively be a laminate comprising the mesh or perforated sheet of metallic material bonded to or sandwiched between one or more sheets of transparent glass or plastic which is both RF and optically transmissive. This type of construction is common to view windows which are employed in doors of conventional microwave ovens.

It is apparent that each embodiment of a privacy shield described above with reference to FIGS. 4-8 can be readily adapted by the skilled artisan applying the teaching herein to include a view window as described above within the respective embodiment of the privacy shield.

The card retention assembly 10 and its specific embodiment 10f as described above have a number of practical advantages. Such a card retention assembly is relatively inexpensive to manufacture and convenient to use. The card retention assembly effectively prevents unintended reading of information contained in an RFID card and/or effectively prevents undesired detection of an RFID card by a proximal card reader. The card retention assembly also effectively prevents a card holder from losing or misplacing an RFID card. It is further noted that the outer surface of the privacy shield 12 is highly visible when the card retention assembly is worn by a card holder. Accordingly, the privacy shield 12 provides an effective placement for advertisements, company logos, or other types of graphic designs or alpha-numeric messages.

While the forgoing preferred embodiments of the invention have been described and shown, it is understood that alternatives and modifications, such as those suggested and others, may be made thereto and fall within the scope of the invention.

I claim:

1. A card retention assembly comprising:
  a shield having a card receptacle and an opening into said card receptacle, wherein said card receptacle and said opening are sized to receive an RFID card into said card receptacle through said opening, and wherein said shield is sufficiently non-transmissive of radio frequency signals to enable said shield to essentially prevent radio frequency communication between an RFID card positioned in said card receptacle and a card reader positioned proximal to said shield; and
  a retraction mechanism external to and connected with said shield having a retracted position and an extended position, said retraction mechanism including a spool and a retention line connected to and windable around said spool, wherein said retention line extends into said card receptacle through a retention line pathway that extends through a housing aperture that is formed through a housing and a shield aperture that is formed through said shield, wherein said retention line is connectable to an RFID card receivable in said card receptacle, further wherein said retention line unwinds from said spool when said retraction mechanism transitions from said retracted position to said extended position and said retention line winds onto said spool when said retraction mechanism transitions from said extended position to said retracted position.

2. The card retention assembly of claim 1 further comprising a biasing spring coupled to said spool.

3. The card retention assembly of claim 1, wherein said spool is biased in a rotational direction to bias said retraction mechanism in said retracted position.

4. The card retention assembly of claim 1, wherein said retraction mechanism further includes said housing enclosing a housing chamber, wherein said spool is disposed within said housing chamber and wherein said housing is coupled to said shield.

5. The card retention assembly of claim 1, wherein said shield includes opposing front and rear planar sections bounding said front and rear of said card receptacle.

6. The card retention assembly of claim 5 wherein said shield further includes first and second side sections formed between said front and rear planar sections along side edges of said front and rear planar sections and bounding corresponding sides of said card receptacle and further includes a top section formed between said front and rear planar sections along top edges of said front and rear planar sections and bounding a corresponding top of said card receptacle, and wherein said opening into said card receptacle is positioned between said front and rear planar sections along bottom edges of said front and rear planar sections.

7. The card retention assembly of claim 1, wherein said shield consists essentially of a shell relatively non-transmissive of radio frequency signals.

8. The card retention assembly of claim 7, wherein said shell is constructed from a metallized plastic or a metal.

9. The card retention assembly of claim 1, wherein said shield comprises a shell relatively non-transmissive of radio frequency signals and an insulative layer constructed relatively transmissive of radio frequency signals disposed on a surface of said shell.

10. The card retention assembly of claim 9, wherein said insulative layer is constructed from a polymeric foam.

11. The card retention assembly of claim 1, wherein said shield comprises a shell relatively transmissive of radio frequency signals and an insert relatively non-transmissive of radio frequency signals disposed within said shell.

12. The card retention assembly of claim 11, wherein said shell is constructed from a plastic and said insert is constructed from a metallized plastic or a metal.

13. The card retention assembly of claim 1, wherein said shield includes an indent sufficiently sized to partially expose an RFID card positioned in said card receptacle and enable a card holder to grasp the RFID card and manually withdraw the RFID card from of said card receptacle.

14. The card retention assembly of claim 1, wherein said shield includes a view window that is sufficiently optically transparent of light to enable viewing of a portion of the whole of an RFID card positioned in said card receptacle through said view window and wherein said view window is sufficiently non-transmissive of radio frequency signals to enable said window to essentially prevent radio frequency communication between an RFID card positioned in said card receptacle and a card reader positioned proximal to said shield.

15. A card retention assembly comprising:
a shield having a card receptacle and an opening into said card receptacle, wherein said card receptacle and said opening are sized to receive an RFID card into said card receptacle through said opening, and wherein said shield is sufficiently non-transmissive of radio frequency signals to enable said shield to essentially prevent radio frequency communication between an RFID card positioned in said card receptacle and a card reader positioned proximal to said shield, and further wherein said shield includes opposing front and rear planar sections bounding said front and rear of said card receptacle, first and second side sections formed between said front and rear planar sections along side edges of said front and rear planar sections and bounding corresponding sides of said card receptacle, a top section formed between said front and rear planar sections along top edges of said front and rear planar sections and bounding a corresponding top of said card receptacle, said opening into said card receptacle positioned between said front and rear planar sections along bottom edges of said front and rear planar sections; and
a retraction mechanism having a retracted position and an extended position, said retraction mechanism including a housing external to and coupled to said shield and enclosing a housing chamber, a spool disposed in said housing chamber and biased in a rotational direction to bias said retraction mechanism in said retracted position, and a retention line connected to and windable around said spool, wherein said retention line extends into said card receptacle through a retention line pathway that extends through a housing aperture that is formed through said housing and a shield aperture that is formed through said shield and is connectable to an RFID card receivable in said card receptacle, further wherein said retention line unwinds from said spool when said retraction mechanism transitions from said retracted position to said extended position and said retention line winds onto said spool when said retraction mechanism transitions from said extended position to said retracted position.

16. The card retention assembly of claim 15, wherein at least one of the front and rear planar sections includes a view window that is sufficiently optically transparent of light to enable viewing of a portion of the whole of an RFID card positioned in said card receptacle through said view window and wherein said view window is sufficiently non-transmissive of radio frequency signals to enable said window to essentially prevent radio frequency communication between an RFID card positioned in said card receptacle and a card reader positioned proximal to said shield.

17. A method for transitioning an RFID card between a retracted position and an extended position comprising:
connecting a first end of a retention line to a spool;
connecting an opposite second end of said retention line to an RFID card;
rotating said spool in a retraction rotation direction to wind said retention line around said spool thereby positioning said RFID card in a retracted position within a card receptacle that is connected to and external to said spool and enclosed by a shield sufficiently non-transmissive of radio frequency signals to enable said shield to essentially prevent radio frequency communication between said RFID card positioned in said card receptacle and a card reader when said RFID card is positioned in a read range of said card reader; and
positioning said RFID card in an extended position by withdrawing said RFID card from said card receptacle to enable radio frequency communication between said RFID card and said card reader when said RFID card is positioned in said read range of said card reader, wherein said spool rotates in an extension rotation direction opposite said retraction rotation direction to unwind said retention line from around said spool when said RFID card is withdrawn from said card receptacle.

18. The method of claim 17 further comprising biasing said spool in said retraction rotation direction to bias said RFID card to said retracted position.

19. The method of claim 17 further comprising positioning said spool external to said card receptacle and providing a shield aperture through said shield to provide a retention line pathway between said spool and said card receptacle.

20. The method of claim 19 further comprising extending said retention line through said shield aperture and out said card receptacle when said RFID card is withdrawn from said card receptacle.

21. The method of claim 17, wherein said RFID card is manually withdrawn from said card receptacle.

22. A card retention assembly comprising:
a shield having a planar section, a view window comprising a portion of the whole of said planar section that is positioned in said planar section, a card receptacle bounded in part by said planar section and an opening into said card receptacle, wherein said card receptacle and said opening are sized to receive an RFID card into said card receptacle through said opening, wherein said planar section and said view window are sufficiently non-transmissive of radio frequency signals to enable said shield to essentially prevent radio frequency communication between an RFID card positioned in said card receptacle and a card reader positioned proximal to said shield, and wherein said view window is sufficiently optically transparent of light to enable viewing a portion of an RFID card positioned in said card receptacle through said view window; and
a retraction mechanism external to and connected with said shield having a retracted position and an extended position, said retraction mechanism including a spool and a retention line connected to and windable around said spool, wherein said retention line extends into said card receptacle through a retention line pathway that extends through a housing aperture that is formed through a housing and a shield aperture that is formed through said shield and is connectable to an RFID card receivable in said card receptacle, further wherein said retention line unwinds from said spool when said retraction mechanism transitions from said retracted position to said extended position and said retention line winds onto said spool when said retraction mechanism transitions from said extended position to said retracted position.

23. The card retention assembly of claim 22, wherein said planar section is constructed from a metallized plastic or a metal.

24. The card retention assembly of claim 22, wherein said planar section is essentially optically opaque.

25. The card retention assembly of claim 22, wherein said view window is constructed from a metallized plastic or a metal.

26. The card retention assembly of claim 25, wherein said view window is configured as a mesh sheet or a perforated sheet of said metallized plastic or said metal.

27. The card retention assembly of claim 26, wherein said view window is further constructed from a sheet of transparent, relatively transmissive material forming a laminate with said mesh sheet or said perforated sheet of said metallized plastic or said metal.

* * * * *